Figure 1:
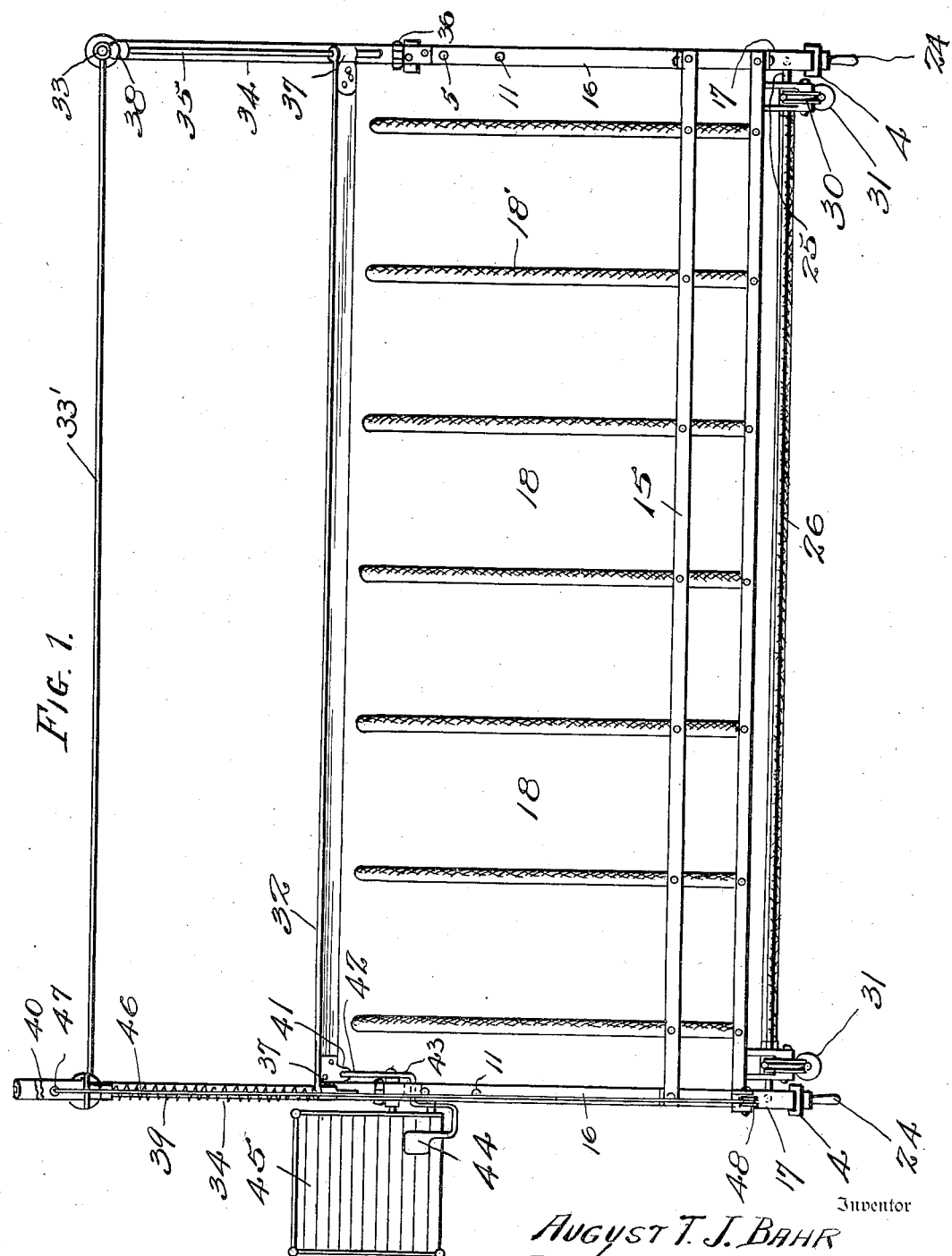

July 15, 1930. A. T. J. BAHR 1,770,450
STARTING MACHINE
Filed May 11, 1928 5 Sheets-Sheet 1

Inventor
AUGUST T. J. BAHR
By Thomas R. Harner
Attorney

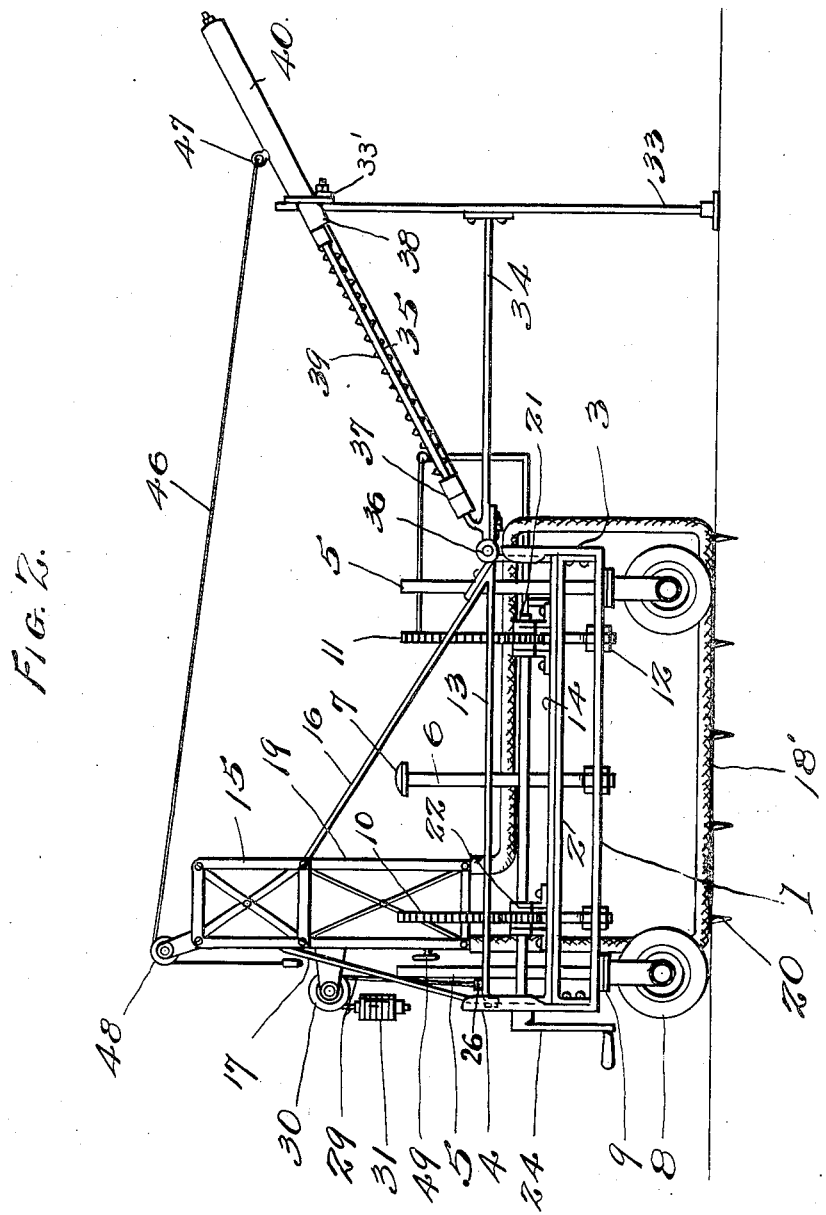

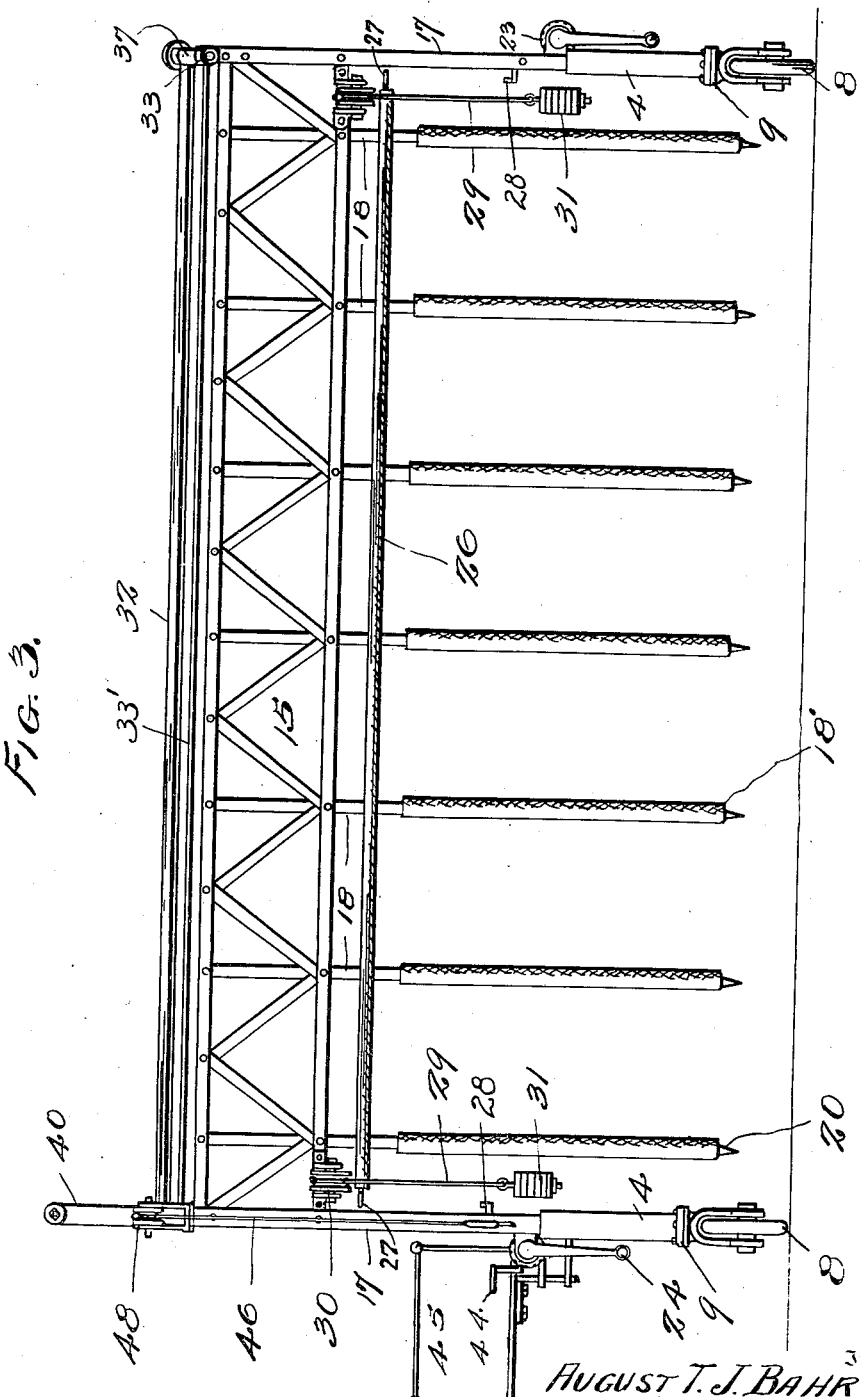

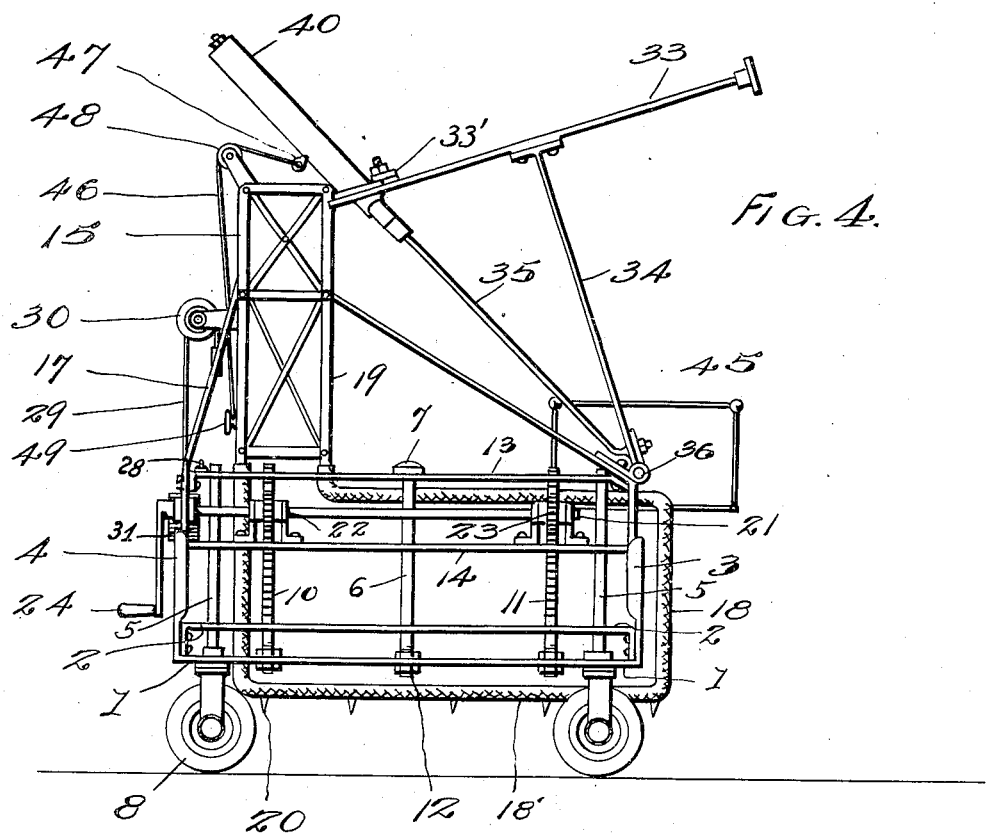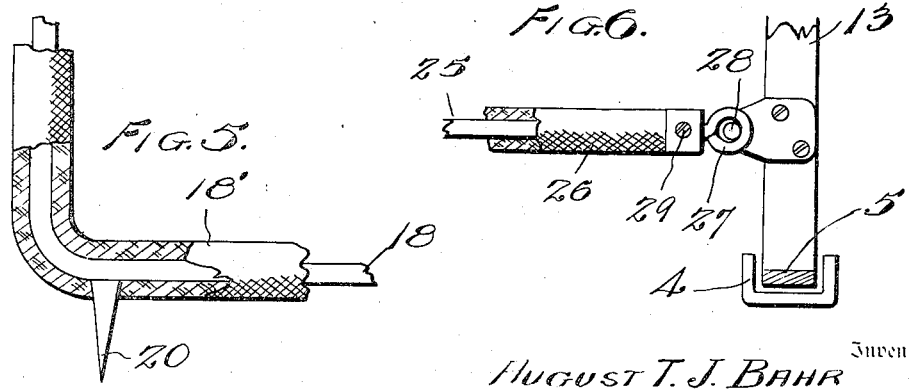

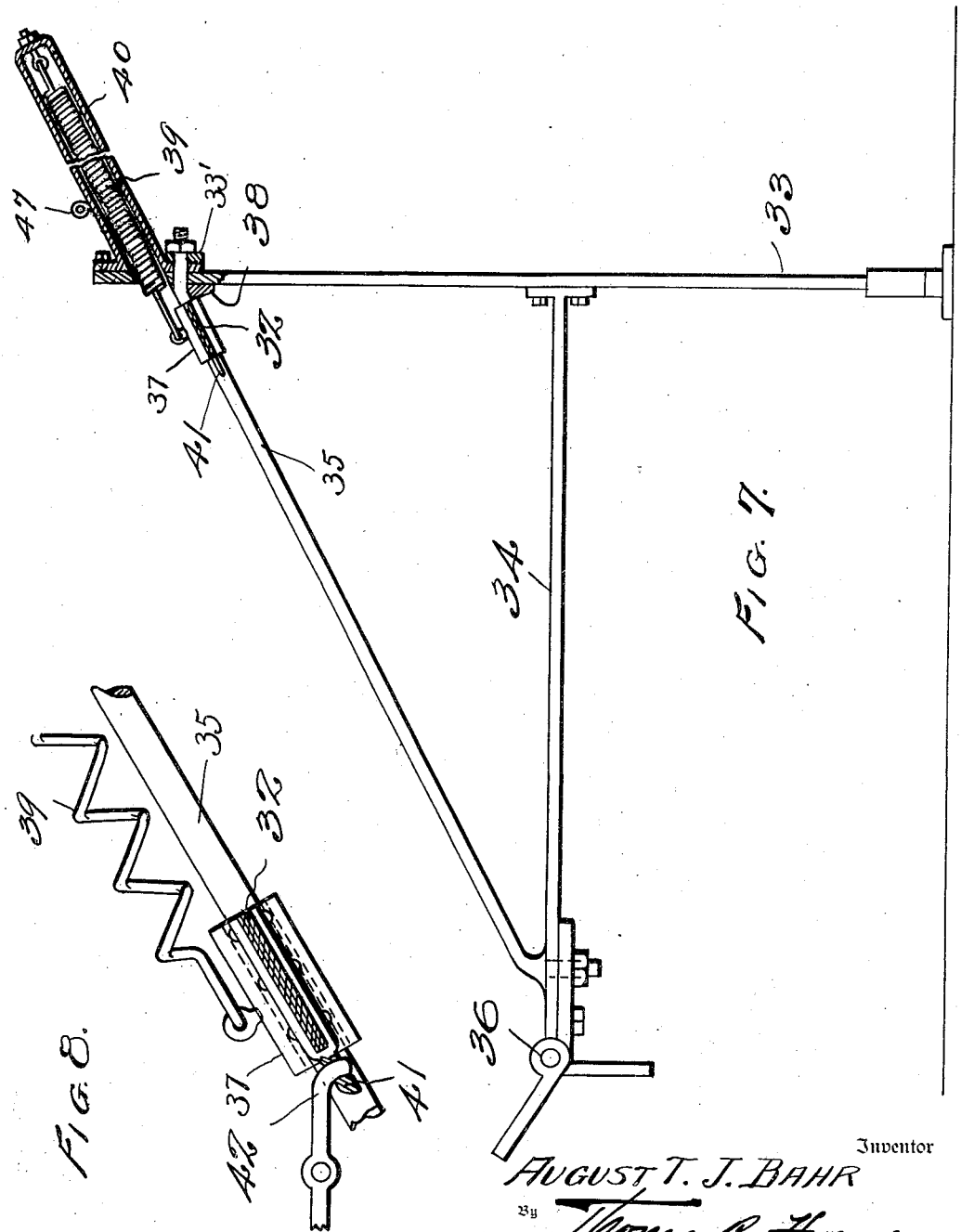

Patented July 15, 1930

1,770,450

UNITED STATES PATENT OFFICE

AUGUST T. J. BAHR, OF KANSAS CITY, MISSOURI, ASSIGNOR, BY MESNE ASSIGNMENTS, TO CHICAGO BUSINESS MEN'S RACING ASSOCIATION, OF CHICAGO, ILLINOIS, A CORPORATION OF ILLINOIS

STARTING MACHINE

Application filed May 11, 1928. Serial No. 276,881.

My present invention relates to an improved starting machine for use at race tracks in starting horse races, whippet races, etc. My invention contemplates the employment of a portable, wheeled appliance that may be drawn by a tractor, by horsepower, or the appliance may manually be rolled to and from starting position, and the portability of the appliance permits it to be drawn from place to place on the race track in order that shorter or longer races may be started from the machine. The appliance or machine is capable of being manufactured in various sizes to accommodate different numbers of horses starting in the race, and for this purpose the stalls may be arranged in sections of predetermined numbers and one or more sections of stalls may be employed as required.

The portability of the appliance also adapts it for use by horse breeders and trainers to school the young horses and train the old ones for the race. In carrying out my invention I utilize a pair of wheeled base frames and a relatively movable vertically adjustable stall frame, and provide means whereby the latter frame may be lifted or elevated so that the weight of the machine or appliance will be imposed on the wheeled base frames for transportation, and when the appliance is being moved into and out of starting position, and when starting the race, the weight of the appliance is shifted from the base frames to the stalls and the stalls are then rigidly held for the start of the race. In starting position the stalls to accommodate the horses, are of course maintained in alignment to insure a fair and even start for all of the horses, and the getaway is quickly arranged and effected.

After the getaway the stalls are with facility elevated from the surface of the track the weight of the appliance is shifted to the wheels, and the machine may then quickly be rolled from the track out of the way of the racing horses.

The stalls are equipped with movable front and rear barriers, the latter beign controlled by track attendants, and the forward or front barrier being under control of the starter. The starter occupies a stand or platform conveniently supported on the appliance where he may observe the starting horses and at the proper time raise the barrier for the start of the race. Means are provided under control of the starter whereby a spring operated front barrier may with facility be released by the starter and removed without possibility of unfair advantage to a jockey or contestant, and the barrier as arranged and operated prevents a jockey from "beating the barrier".

The machine or appliance contemplates the use of a foldable barrier frame in order that the machine may be compactly arranged for transportation, and for movement to and from the starting point on the track.

The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have so far devised for the practical application of the principles of my invention.

Figure 1 is a top plan view of a starting machine with stalls to accommodate six contestants, the front and rear barriers being set in position for the start. Figure 2 is a view in side elevation of the machine as seen from the right in Figure 1. Figure 3 is a rear view of the machine with the barriers lifted, view of the stall frame elevated, and the weight of the appliance imposed upon the wheels of the base frames, for transportation of the appliance. Figure 4 is a side elevation of the machine as seen from the right in Figure 3. Figure 5 is an enlarged detail view partly in section showing the construction of one of the stalls. Figure 6 is a detail view showing one end of the rear barrier with its support on the stall frame. Figure 7 is a detail view partly in section showing the spring operating mechanism for the front barrier. Figure 8 is a detail sectional view showing the release latch for the front barrier.

The entire machine or appliance is preferably constructed of metal frames, and as before stated the machine may be manufactured in various sizes to accommodate different numbers of horses, and of course when the machine is used for whippet races the size is reduced to accommodate the smaller animals.

In the preferred form of my invention I use a pair of base frames each of which comprises the horizontal bars or plates 1 and 2 that are fashioned with front and rear upright guides 3 and 4, and the base frames are provided with rigid posts 5, 5, and an intermediate post 6, the latter post having a head 7 to limit relative movement between the base frames and the stall frame as will be described.

The base frames are supported upon four pneumatic wheels as 8 which wheels are swiveled and provided with ball bearings indicated at 9. The wheels are arranged in pairs below each base frame and they may readily be turned on their ball bearings as the machine or appliance is rolled and shifted into and out of starting position. The base frames each have a pair of rack bars 10 and 11 spacerd apart and disposed in vertical planes, and at their lower ends these rack bars may be bolted as at 12 to the lower plate 1 of the base frames.

The stall frames which are supported on the base frames each comprises a pair of horizontal plates or bars 13 and 14 which are perforated to accommodate the posts and rack bars, and these spaced stall frames are rigidly connected by means of a truss 15 that extends transversely of the track when the machine is in starting position. The stall frames are supported below the elevated truss 15 and braces 16 and 17 at the front and rear are used to rigidly join the truss with the front and rear ends of the stall frames.

In the drawings I have shown six stalls, but it will be understood that this number may be increased or diminished as desired. Each stall partition comprises a spaced rectangular shaped metallic frame as 18 which is covered with a padding or cushion 18' for the protection of the horses, and the padded frames are supported by posts 19 from the truss 15 as indicated in the drawings.

At the under side of each of the stall frames I provide a series of spikes 20 which are adapted to penetrate the surface of the race track and hold the machine against lateral, forward or rearward movement when the machine is in starting position. With the machine as indicated in Figure 2 the weight of the appliance is imposed on the stall frames and the wheels 8, and the spikes 20 penetrate the surface of the track to maintain the appliance in rigid position.

The two stall frames are each provided with a gear shaft 21 which is supported in bearings 22 on the stall frames, and these gear shafts are provided with gears 23 that cooperate with the pairs of rack bars 10 and 11.

A crank handle 24 is provided at the rear end of each of the shafts, and two attendants may operate the gear shafts in unison for lowering the stall frames to starting position, or for elevating the stall frames from starting position. The gears 23 of course remain in mesh at all times with the rack bars 10 and 11.

A front barrier and a rear barrier are provided for the machine, the rear barrier being fashioned with an inner bar 25 surrounded by a padding or cushion 26. At its ends the barrier is provided with eyes 27 that are adapted to slip over stud bolts or pins 28 on the stall frame at each side of the machine. When in starting position the rear barrier is supported on the two pins 28, and the barrier may conveniently be elevated or lowered through the utilization of a pair of cables 29 which pass over pulleys 30 journaled in bearings supported from the truss 15. By means of counter-weights 31 the rear barrier is balanced so that it may quickly and with facility be lowered or raised as desired. Of course it will be understood that the barrier is lowered after the horses have entered their stalls in the starting machine to prevent them from backing out of their stalls.

The front barrier 32 which is fashioned preferably of a wide elastic tape and reinforced if necessary is carried on a hinged frame at the front of the appliance or starting machine. The front barrier frame comprises two posts 33 spaced apart at the front ends of the appliance and rigidly connected by a front cross bar 33', located at a suitable height above the ground as not to interfere with the horses. The posts are provided with arms 34 and guide braces 35, the whole barrier frame at each side of the machine being hinged as at 36 to the stall frames.

The barrier has two end sleeves 37 that are loose and adapted to slide on the inclined braces or bars 35 and at the upper outer ends of these bars, rubber bumpers 38 are provided to absorb the shock as the sleeves of the barrier strike against the upper ends of the guide bars 39.

The front barrier is withdrawn from position in front of the horses by the action of a spring 39 which has its upper outer end anchored in a housing 40, and the free end of the spring is connected to the sleeve 37 at one end of the barrier tape. The front barrier is pulled down against the tension of the spring 39, and releasable means are provided for holding the tape or barrier in starting position. These holding means are under control of the starter and may be fashioned in any suitable manner for the purpose. I have herein shown a perforated latch plate 41 carried by one of the sleeves 37, and a latch hook 42 on the end of the pivoted latch 43 is used to retain the barrier in starting position. This latch may be released by the pressure on a pedal 44 by the starter who is located in the stand 45 which is supported at one end of the machine. When the instant arrives for starting the race, the starter depresses the pedal, the hook 42 is released from the latch 41, and the extended spring 39 quickly snaps the front barrier from starting position and pulls the barrier upwardly and outwardly from the heads of the horses and the barrier reaches its upmost position so that the contestants may pass thereunder at the start of the race. The length of the front barrier tape is of course governed by the number of starting stalls employed in the machine, and the length of the guide braces 35, in all cases, is correctly proportioned to the length of the tape. The loose slide sleeves 37 permit the initial pull exerted by the released spring 39 on one end of the tape to snap the tape from its angle of repose, and the continued pull of the spring lifts the entire barrier or tape with a quick sliding movement of the sleeves for the purpose of releasing the horses.

When the machine is to be moved, the barrier frames are tilted or folded back on the machine as indicated in Figure 4, and for this purpose I provide a pull cable 46 which is attached at 47 to the housing 40, and this cable passes to the rear over a pulley 48. The attendant at the rear of the machine may fold the barrier frame back on the machine and then secure the end of the cable or rope on the cleat 49.

Having thus fully described my invention what I claim as new and desire to secure by Letters Patent is:—

1. In a portable starting machine, the combination with a pair of spaced base frames, of a rigid, vertically movable stall-structure including stall-partitions, and means for moving the stall-structure relatively to the base frames whereby the weight of the machine is borne by the stall-partitions.

2. In a portable starting machine, the combination with a pair of spaced base frames, of a rigid, vertically movable stall structure including stall partitions, spikes on the stall partitions to enter the surface of a track, and means for moving the stall-structure relatively to the base frames whereby the weight of the machine is borne by the stall-partitions.

3. In a portable starting machine, the combination with a pair of spaced base frames, of a rigid, vertically movable stall-structure including stall partitions, rack bars rigid with the base frames, gear shafts supported on the stall-structure, and gears on said shafts for co-action with the racks, whereby the weight of the implement is borne by the stall-partitions.

4. The combination, in a starting implement with a pair of base frames having swiveled supporting wheels and a pair of posts on each frame, of a pair of stall frames and a series of stall-partitions rigidly supported therefrom, said stall frames having perforations to accommodate the posts, and means for relatively moving the stall frames whereby the weight of the implement is borne by the stall-partitions.

5. The combination in a starting implement with a pair of spaced base frames having a plurality of swiveled supporting wheels, a pair of guide posts on each base frame, and a pair of rack bars rigid with each base frame, of a pair of stall frames movable relatively to the base frames and guided by said posts, stall-partitions rigid with the stall-frames, a gear shaft for each stallframe, and rack gears on said shafts, whereby the weight of the implement is borne by the stall-partitions.

6. In a portable starting machine, the combination with a pair of spaced base frames, of a rigid vertically movable stall-structure including stall-partitions, a foldable barrier frame supported on the stall-structure and a barrier carried by the barrier frame, and means for moving the stall-structure relatively to the base frames whereby the weight of the implement is borne by the stall-partitions.

7. The combination with a starting machine, of a hinged barrier frame and guide rods thereon, a barrier having end sleeves slidable on the rods, means for retaining the barrier in starting position, means for releasing the barrier, and means for displacing the barrier.

In testimony whereof I have affixed my signature.

AUGUST T. J. BAHR.